(12) United States Patent
Lee et al.

(10) Patent No.: US 8,391,001 B2
(45) Date of Patent: Mar. 5, 2013

(54) ELECTRONIC DEVICE AND SLIDING HINGE THEREOF

(75) Inventors: Ying-Xing Lee, Taoyuan County (TW); Chien-Wei Huang, Taoyuan County (TW); Chien-Hung Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 224 days.

(21) Appl. No.: 12/711,936

(22) Filed: Feb. 24, 2010

(65) Prior Publication Data

US 2011/0051328 A1  Mar. 3, 2011

(30) Foreign Application Priority Data

Sep. 3, 2009 (TW) .............................. 98129685 A

(51) Int. Cl.
*H05K 5/00* (2006.01)
*H05K 7/00* (2006.01)
*G06F 1/16* (2006.01)

(52) U.S. Cl. .............. 361/679.56; 361/679.3; 455/575.4

(58) Field of Classification Search ............ 361/679.21, 361/679.26, 679.3, 679.55, 679.56; 455/575.1–575.4
See application file for complete search history.

(56) References Cited

U.S. PATENT DOCUMENTS

| | | | | |
|---|---|---|---|---|
| 6,822,871 B2 * | 11/2004 | Lee et al. | ...................... | 361/727 |
| 7,422,436 B2 * | 9/2008 | Lee | .................................. | 439/10 |
| 7,496,389 B2 * | 2/2009 | Cho et al. | .................... | 455/575.4 |
| 7,548,769 B2 * | 6/2009 | Lee et al. | ..................... | 455/575.1 |
| 7,672,699 B2 * | 3/2010 | Kim et al. | ................... | 455/575.4 |
| 7,869,846 B2 * | 1/2011 | Seo | .............................. | 455/575.4 |
| 2006/0079299 A1 * | 4/2006 | Chen et al. | ................. | 455/575.1 |
| 2006/0154703 A1 * | 7/2006 | Kim | ............................ | 455/575.4 |
| 2007/0032278 A1 * | 2/2007 | Lee et al. | .................... | 455/575.4 |
| 2007/0238494 A1 | 10/2007 | Pan | | |
| 2008/0081505 A1 | 4/2008 | Ou et al. | | |
| 2009/0016029 A1 | 1/2009 | Liu | | |
| 2009/0036180 A1 * | 2/2009 | Ye | .............................. | 455/575.4 |
| 2009/0069059 A1 * | 3/2009 | Min et al. | .................... | 455/575.4 |
| 2009/0116200 A1 * | 5/2009 | Yeh | ............................... | 361/730 |
| 2009/0149228 A1 * | 6/2009 | Wang et al. | ................ | 455/575.4 |
| 2009/0156274 A1 * | 6/2009 | Wang | .......................... | 455/575.4 |
| 2009/0176543 A1 | 7/2009 | Park et al. | | |
| 2009/0325656 A1 * | 12/2009 | Tang | .......................... | 455/575.4 |
| 2010/0016042 A1 * | 1/2010 | Shim et al. | ................. | 455/575.4 |
| 2010/0029348 A1 * | 2/2010 | Lee et al. | .................... | 455/575.4 |
| 2011/0045879 A1 * | 2/2011 | Kim et al. | ................... | 455/575.4 |
| 2011/0077053 A1 * | 3/2011 | Lee et al. | ....................... | 455/566 |

\* cited by examiner

*Primary Examiner* — Adrian S Wilson

(74) *Attorney, Agent, or Firm* — Birch, Stewart, Kolasch & Birch, LLP

(57) ABSTRACT

A sliding hinge is provide, including a first member, a cover, a bottom cover movable relative to the first member, a sling plate fixed to the bottom cover, and an elastic module. The first member has a main body and a connection portion protruding therefrom, wherein the connection portion has a recess. The cover is fixed to the connection portion, wherein the cover and the first member form a space therebetween to receive the sling plate and the elastic module. The elastic module has an end received in the recess.

18 Claims, 6 Drawing Sheets

ELECTRONIC DEVICE AND SLIDING HINGE THEREOF

CROSS REFERENCE TO RELATED APPLICATIONS

This application claims priority of Taiwan Patent Application No. 098129685, filed on Sep. 3, 2009, the entirety of which is incorporated by reference herein.

TECHNICAL FIELD

The application relates in general to a sliding hinge and in particular to a sliding hinge of an electronic device.

DESCRIPTION OF THE RELATED ART

Referring to FIG. 1, a conventional sliding-type mobile phone or PDA includes a display module 100 and an input module 200 reciprocally movable with respect to each other, as the arrow indicates in FIG. 1, wherein the display module 100 includes a screen 300, and the input module 200 includes a keypad 400.

Generally, the input module 100 and the display module 200 are connected via a semi-auto sliding hinge, such as the semi-auto sliding hinge S shown in FIG. 2A. The sliding hinge S of FIG. 2A includes two elastic modules 10, a bottom cover 20, a second member 40, and a first member 50. The bottom cover 20 is mounted on the display module 100, the first member 50 is mounted on the input module 200, and the second member 40 is fixed to the bottom cover 20.

As shown in FIGS. 2A and 2B, the first member 50 has a main body 51 and two connection portions 52 protruding from the main body 51. The second member 40 below the bottom cover 20 is movably received in a recess between the main body 51 and the connection portions 52. Both ends of the elastic module 10 are pivotally connected to the first member 50 and the second member 40. When the bottom cover 20 and the second member 40 move relative to the first member 50 along the Y direction, the elastic module 10 provides an elastic force to facilitate semi-auto sliding therebetween.

Referring to FIGS. 2A and 2B, the elastic module 10 and the first member 50 are connected to each other by a rivet R. During assembly, the rivet R is fastened through the connection portion 52 and a hole of the elastic module 10. As shown in FIG. 2B, the elastic module 10 and the connection portion 52 must overlap along the Z direction to allow insertion of the rivet R therethrough, thus adversely increasing thickness of the sliding hinge. Furthermore, due to the considerable length d1 of the rivet R, thickness reduction of the sliding hinge and miniaturization of the electronic device is difficult to achieve.

BRIEF SUMMARY

The present application provides a sliding hinge including a first member, a cover, a bottom cover movable relative to the first member, a sling plate fixed to the bottom cover, and an elastic module. The first member has a main body and a connection portion protruding therefrom, wherein the connection portion has a recess. The cover is fixed to the connection portion, wherein the cover and the first member form a space therebetween to receive the sling plate and the elastic module. The elastic module has an end received in the recess.

BRIEF DESCRIPTION OF DRAWINGS

The application can be more fully understood by reading the subsequent detailed description and examples with references made to the accompanying drawings, wherein.

DETAILED DESCRIPTION

Figure 1:
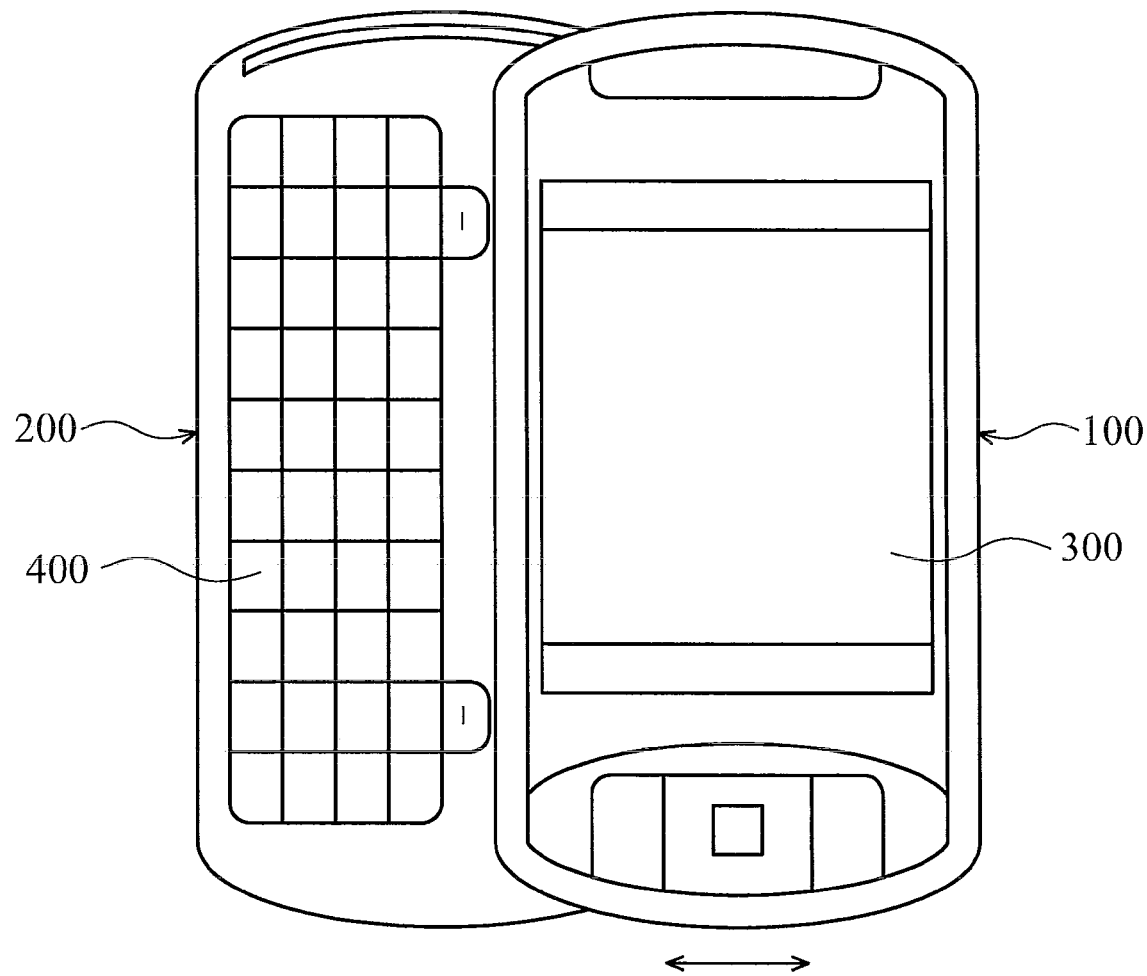
FIG. 1 is a perspective diagram of a conventional sliding-type electronic device.
Figure 2A:
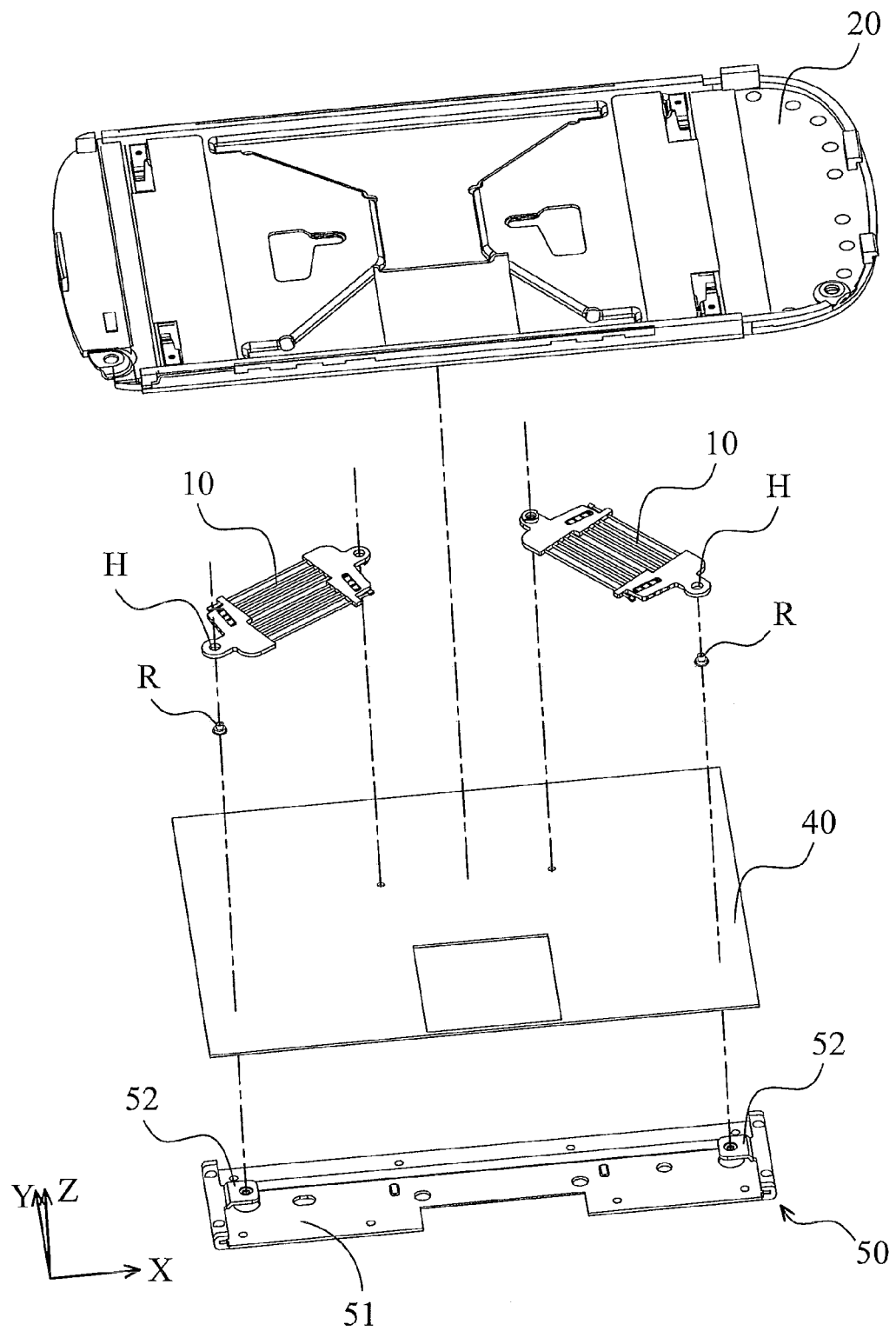
FIG. 2A is an exploded diagram of a conventional sliding hinge.
Figure 2B:
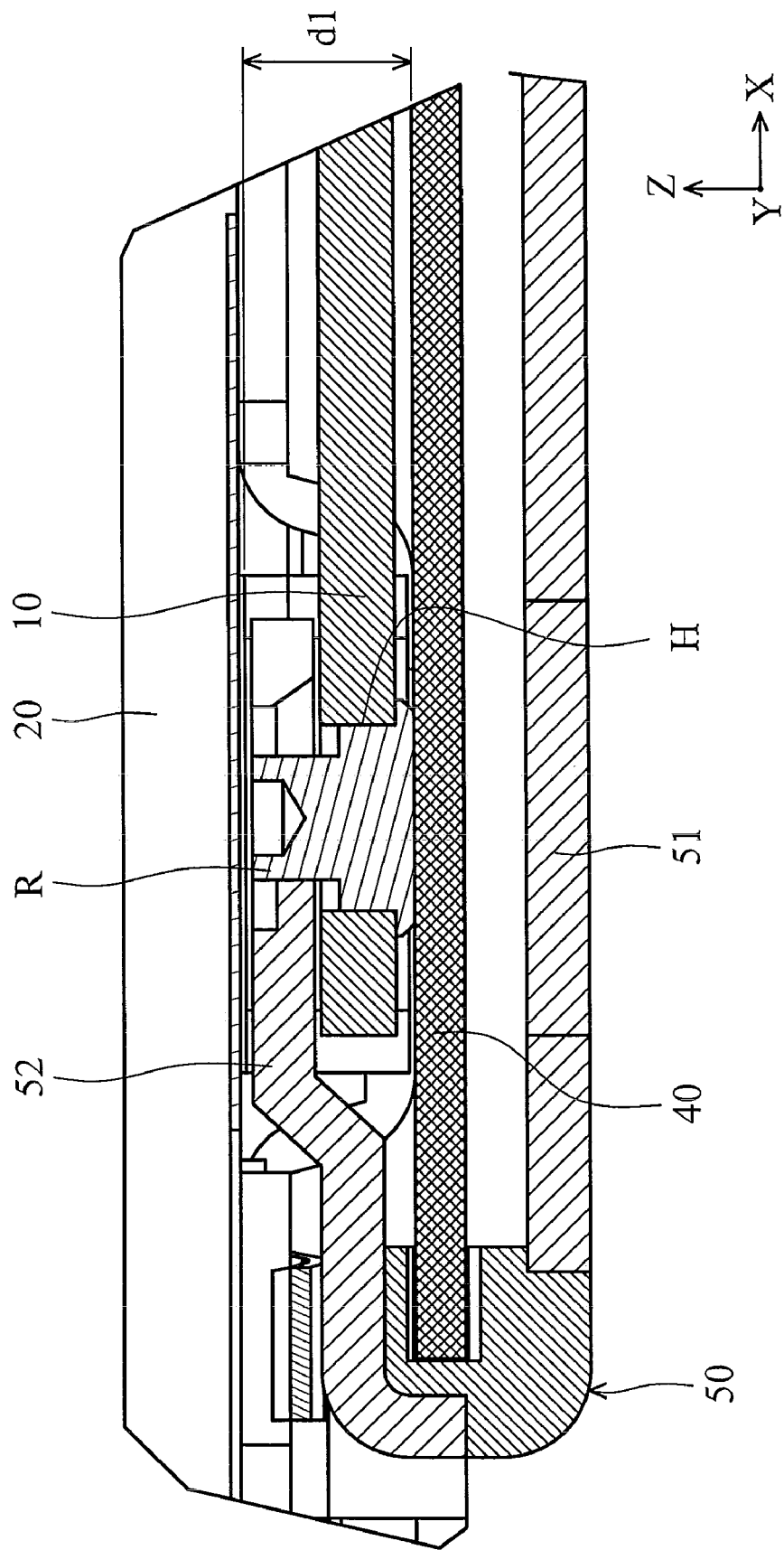
FIG. 2B is a sectional view of a conventional sliding hinge.
Figure 3:
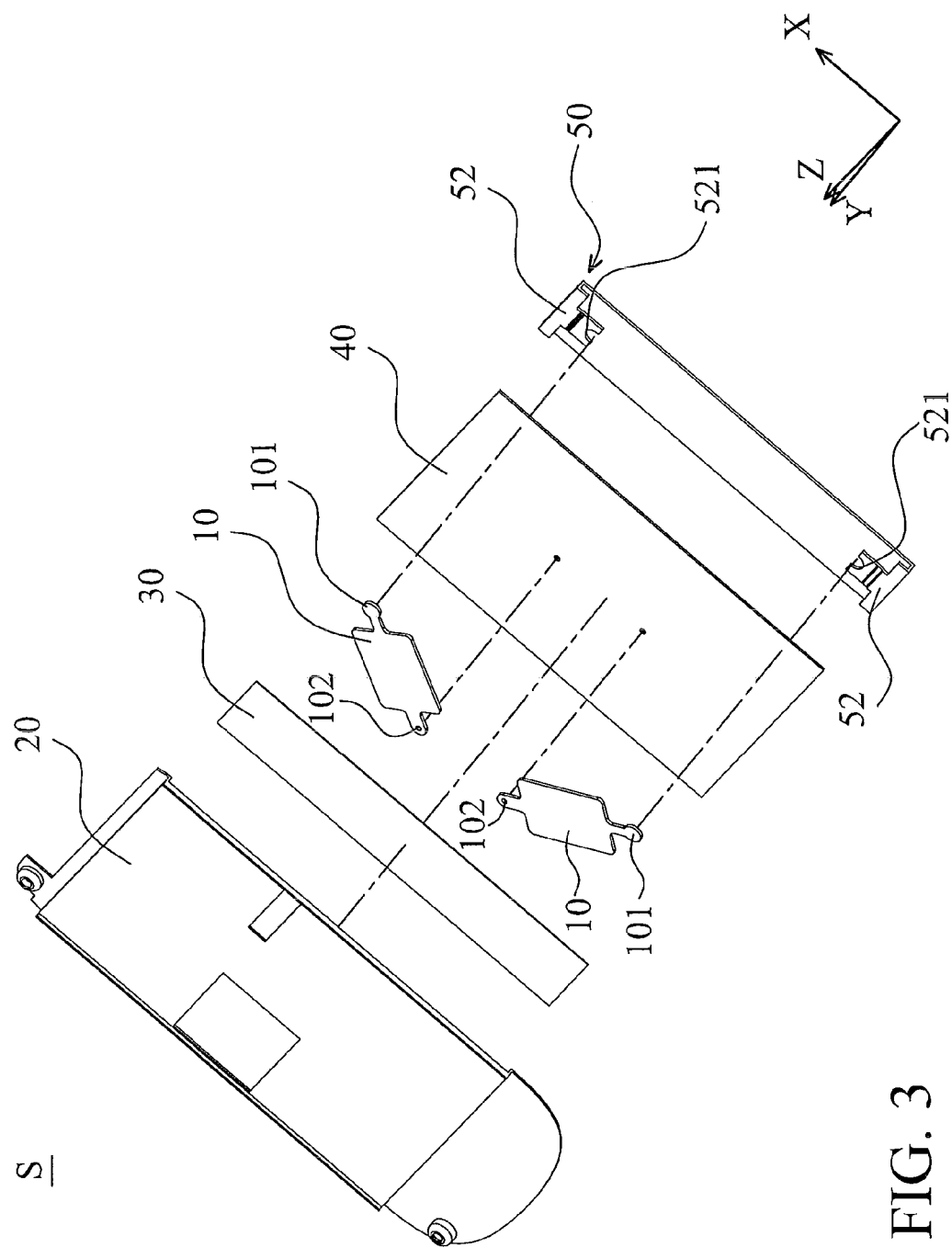
FIG. 3 is an exploded diagram of a sliding hinge according to an embodiment of the invention.

Referring to FIG. 3, according to an embodiment of the invention, a sliding hinge S is provided to connect a display module and an input module of an electronic device, such as the display module 100 and the input module 200 shown in FIG. 1. The sliding hinge S of FIG. 3 includes two elastic modules 10, a bottom cover 20, a cover 30, a second member 40, and a first member 50. The second member 40 is fixed to the bottom cover 20, and the cover 30 is fixed on the first member 50. In this embodiment, the bottom cover 20 and the first member 50 are respectively fixed to the aforesaid display module and input module. Specifically, the bottom cover 20 and the second member 40 are movable with respect to the first member 50. Hence, the display module and the input module are reciprocally movable along the Y axis via the sliding hinge S.

Figure 4:
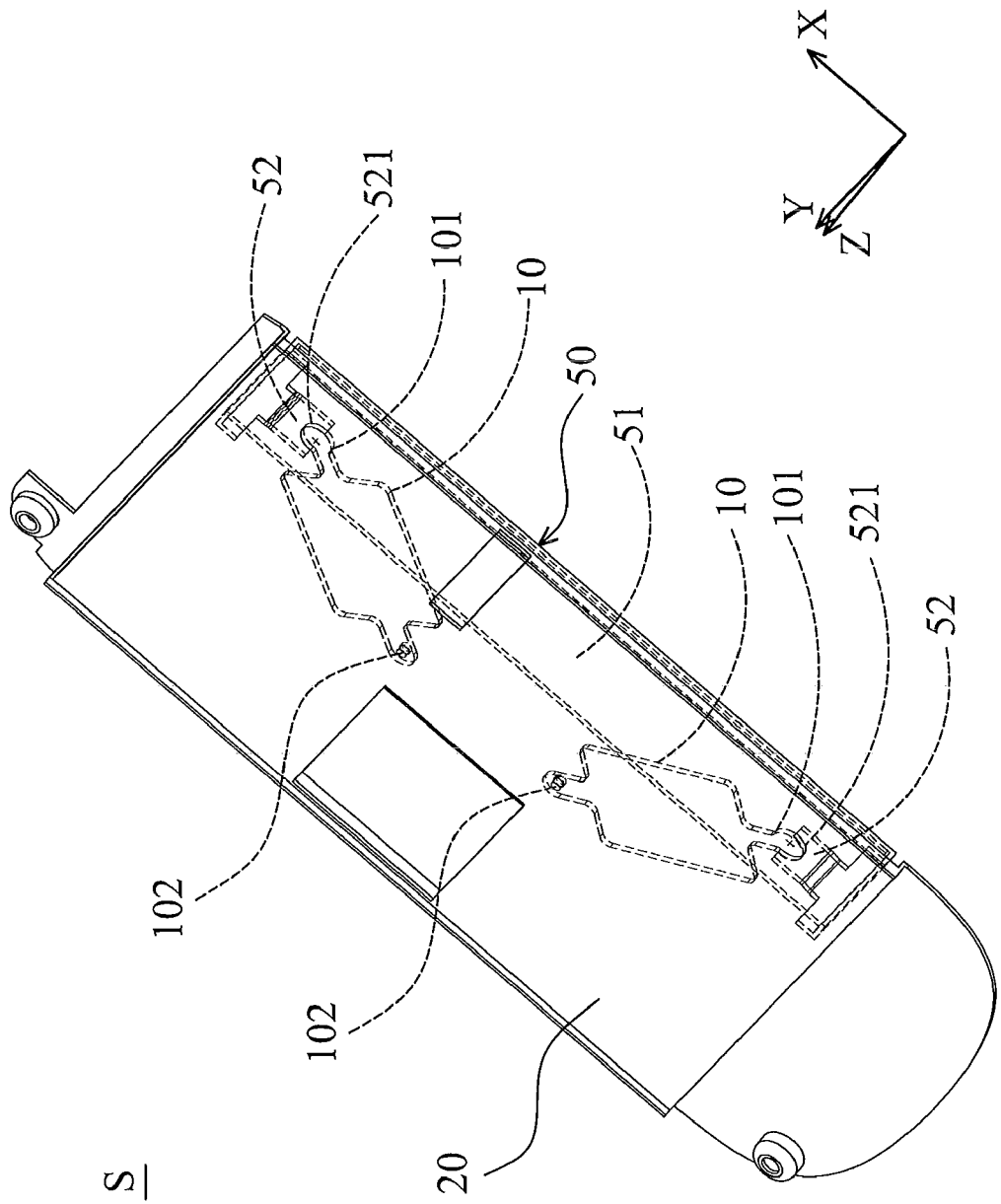
FIG. 4 is a perspective diagram of a sliding hinge according to another embodiment of the invention.
Figure 5:
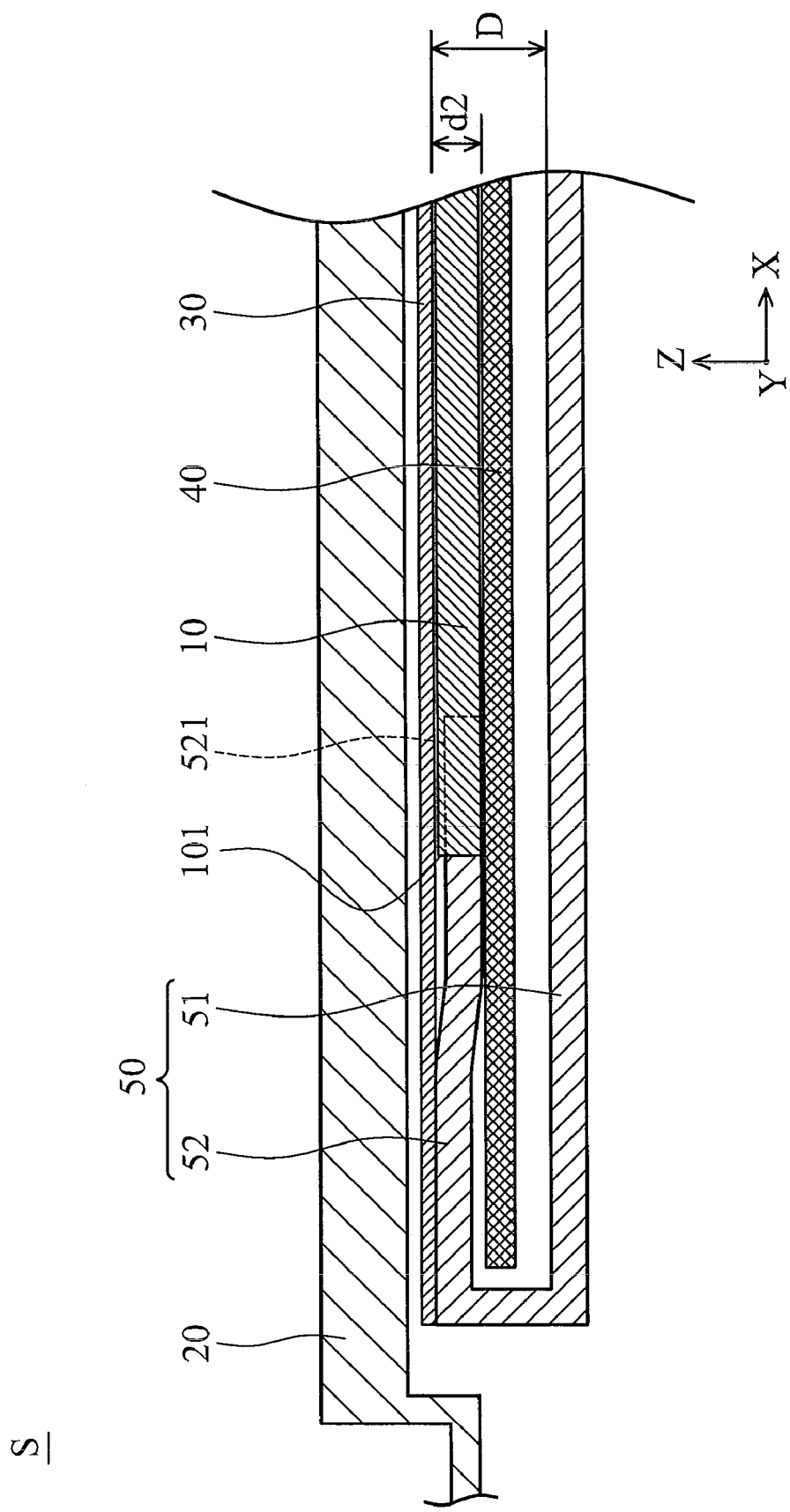
FIG. 5 is a sectional view of a sliding hinge according to another embodiment of the invention.

Referring to FIGS. 3-5, the first member 50 has a main body 51 and two connection portions 52 formed at opposite sides thereof. The connection portions 52 are L-shaped and protrude from the main body 51 along the Z direction. As shown in FIG. 5, the cover 30 is fixed to the top side of the connection portion 52, wherein a space of height D is formed between the cover 30 and the main body 51 of the first member 50 to receive the elastic modules 10 and the second member 40.

In this embodiment, the bottom cover 20 and the second member 40 are fixed to each other, wherein the second member 40 is movably received in the space between the cover 30 and the first member 50. When the display module moves with respect to the input module, the bottom cover 20 and the second member 40 slide relative to the cover 30 and the first member 50 along the Y direction. As shown in FIG. 3, each of the elastic modules 10 has an end 102 pivotally connected to the second member 40 and an end 101 coupled to the connection portion 52 of the first member 50, thus providing an elastic force to facilitate semi-auto sliding of the sliding hinge S.

In FIGS. 3-4, the connection portion 52 has a curved recess 521 at an edge thereof, and the end 101 of the elastic module 10 has a curved structure corresponding to the recess 521. During assembly, the curved end 101 is received in the recess 521, so as to couple the elastic module 10 with the first member 50. As depicted in FIGS. 4 and 5, the end 101 and the recess 521 are substantially situated in the same horizontal plane, wherein the thickness of the elastic module 10 is substantially equal to that of the recess 521. In an exemplary embodiment, the recess 521 is semicircular in shape, corresponding to the end 101 of the elastic module 10. The elastic module 10 may comprise a torsion spring or coil spring to facilitate semi-auto sliding of the sliding hinge S.

As mentioned above, the connection portion 52 of the first member 50 has a curved recess at an edge thereof to movably couple with the end 101 of the elastic module 10. According to the aforesaid embodiments, the rivet is not necessary and can be omitted from the sliding mechanism to save production costs. Additionally, since the elastic module 10 and the connection portion 52 of the first member 50 can be arranged substantially in the same horizontal plane without vertical overlap in the Z direction, total thickness of the interior components of the sliding hinge S can be reduced, as the thickness d2 in FIG. 5 shows, wherein d2<d1. Hence, miniaturization of the electronic device may efficiently be achieved.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A sliding hinge for connecting a display module with an input module of an electronic device, comprising:
   a first member fixed to the input module, comprising a main body and a connection portion, wherein the connection portion protrudes from the main body and has an extension portion extending above and parallel with the main body, the extension portion having a recess formed thereon;
   a cover fixed to the connection portion, wherein the cover and the first member form a space therebetween;
   a bottom cover, fixed to the display module;
   a second member, fixed to the bottom cover and movably received in the space; and
   an elastic module received in the space, comprising an end received in the recess, wherein the recess and the end of the elastic module are curved and substantially situated in the same plane.

2. The sliding hinge as claimed in claim 1, wherein the connection portion is L-shaped at a cross section.

3. The sliding hinge as claimed in claim 1, wherein the elastic module is disposed between the cover and the second member.

4. The sliding hinge as claimed in claim 1, wherein the cover is disposed between the bottom cover and the first member.

5. The sliding hinge as claimed in claim 1, wherein the recess is semicircular in shape.

6. The sliding hinge as claimed in claim 1, wherein the thickness of the elastic module is substantially equal to that of the recess.

7. The sliding hinge as claimed in claim 1, wherein the elastic module pivotally connects to the second member.

8. The sliding hinge as claimed in claim 1, wherein the elastic module comprises a torsion spring or coil spring.

9. The sliding hinge as claimed in claim 1, wherein the sliding hinge further comprises two elastic modules, and the first member further comprises two connection portions formed at opposite sides of the main body, wherein the elastic modules respectively couple to the connection portions.

10. An electronic device, comprising:
    an input module;
    a display module;
    a sliding hinge, movably connecting the display module with the input module, comprising:
    a first member fixed to the input module, comprising a main body and a connection portion, wherein the connection portion protrudes from the main body and has an extension portion extending above and parallel with the main body, the extension portion having a recess formed thereon;
    a cover fixed to the connection portion, wherein the cover and the first member form a space therebetween;
    a bottom cover, fixed to the display module;
    a second member, fixed to the bottom cover and movably received in the space; and
    an elastic module received in the space, comprising an end received in the recess, wherein the recess and the end of the elastic module are curved and substantially situated in the same plane.

11. The electronic device as claimed in claim 10, wherein the connection portion is L-shaped at a cross section.

12. The electronic device as claimed in claim 10, wherein the elastic module is disposed between the cover and the second member.

13. The electronic device as claimed in claim 10, wherein the cover is disposed between the bottom cover and the first member.

14. The electronic device as claimed in claim 10, wherein the recess is semicircular in shape.

15. The electronic device as claimed in claim 10, wherein the thickness of the elastic module is substantially equal to that of the recess.

16. The electronic device as claimed in claim 10, wherein the elastic module pivotally connects to the second member.

17. The electronic device as claimed in claim 10, wherein the elastic module comprises a torsion spring or coil spring.

18. The electronic device as claimed in claim 10, wherein the sliding hinge further comprises two elastic modules, and the first member further comprises two connection portions formed at opposite sides of the main body, wherein the elastic modules respectively couple to the connection portions.

* * * * *